June 19, 1934.  A. E. RADKE ET AL  1,963,805
PLUMB LEVEL SQUARE
Filed Nov. 7, 1932
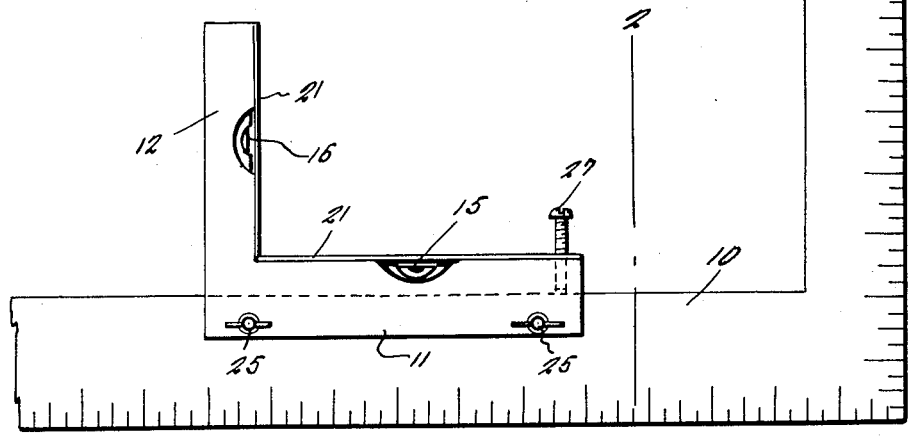
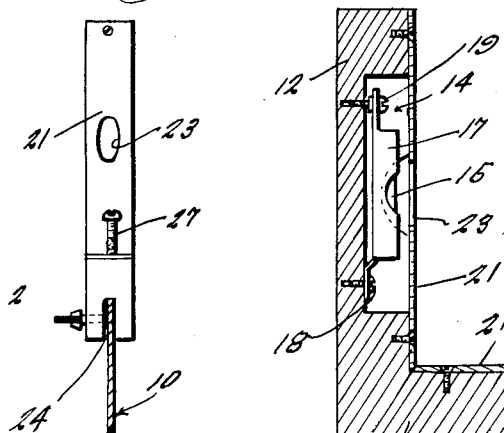
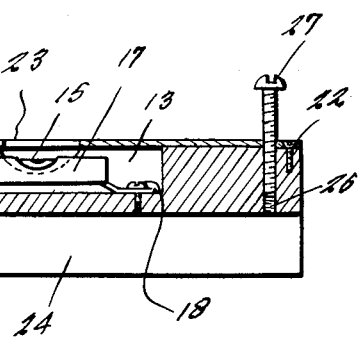
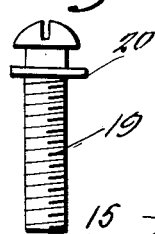
Inventor
A. E. Radke
J. E. Walter
By Clarence A. O'Brien
Attorney Patented June 19, 1934

1,963,805

UNITED STATES PATENT OFFICE 1,963,805

PLUMB LEVEL SQUARE

Albert E. Radke, Kenosha, Wis., and John E. Walter, Waukegan, Ill.

Application November 7, 1932, Serial No. 641,666

1 Claim. (Cl. 33—89)

This invention is an instrument combining the function of a spirit level, plumb level, and square and consists in the provision of a level and plumb gauge adapted to be attached to a square for use with the square although, in actual practice, it will be found that the level and plumb gauge may be used independently of the square and is not confined wholly to use in connection with the square.

The invention together with its numerous objects and advantages will be best understood from a study of the following description, taken in connection with the accompanying drawing wherein:

Figure 1 is a side elevational view of the improved level and plumb gauge, the same being shown operatively applied to a steel square.

Figure 2 is a sectional view taken substantially on the line 2—2 of Figure 1.

Figure 3 is a sectional elevational view taken through the level and plumb square.

Figure 4 is an enlarged view of an adjusting screw and

Figure 5 is a plan view of a level bulb and casing therefor.

Referring to the drawing by reference numerals 10 indicates a typical steel square. In the illustrated embodiment thereof the invention consists in a substantially L-shaped frame the base of which is designated by the reference numeral 11, and the arm of which is designated by the reference numeral 12. Base 11 and arm 12 are provided with substantially elongated rectangular recesses or chambers 13, 14 and arranged in the recess 13 is the level bubble tube 15 while arranged in the recess 14 is a bubble tube 16. The bubble tubes 15, 16 are arranged in protective casings 17, and each of these casings is provided with a flange at one end with which is engaged a screw or other fastening device 18, while at the other end thereof each casing is provided with a similar flange that is slotted to engage the shank of an adjusting bolt 19 between the head of the bolt and a flange or collar 20 provided on the shank of the bolt adjacent to the head as clearly shown in Figure 4. The bolt or screws 19 provided for the casing 17 are screw threadedly engaged with sockets provided in the base 11 and arm 12 and obviously by adjusting the bolt 19, the casing 17 associated therewith may be readily brought into plumb. In this connection it is to be noted that each casing 17 has that flange thereof anchored within the recess by the fastening element 18 offset relative to the bottom of the casing so that an adjustment of the casing 17 may be effected without undue distortion of the casing or its flange.

For the open sides of the recesses 13, 14 there are provided metallic cover plates 21 that are secured by set screws or other fastening elements 22 and each of the cover plates is provided with a sight opening 23.

The base 11 of the frame is provided on its under side with a longitudinal slot or channel 24 for receiving one edge of the arm of the square 10 and thumb screws 25 are screw threadedly engaged with the base 11 at one side of the slot or channel 24 and are adapted to engage said arm of the square 10 in the manner as suggested in Figure 2 for removably securing the base 11 of the frame to the arm of the square 10. It will thus be seen that with the device applied to the arm of the square 10, the square is converted into and may be used as a level. It is also apparent that with the base 11 attached to the said arm of the square 10, the device, without removing it from the square 10 may be used as a plumb gauge, arm 12, and bubble 6 associated therewith being then brought into use.

The base 11 at that end thereof remote from the arm 12 is provided with a vertical threaded aperture 26 with which is threadedly engaged a bolt 27 which may be screwed down onto the edge of the arm of the square 10 to which the device is secured for rotating said end of the base 11 relative to the arm and for securing said base 11 at a desired angle to the arm of the square 10 to indicate a particular pitch. This is especially useful in the laying of pipe wherein a particular fall is desired.

Even though we have herein shown and described the preferred embodiment of the invention, it is to be understood that the same is susceptible of further changes, modifications and improvements coming within the scope of the appended claim.

Having thus described our invention, what we claim as new is:

In an attachment for squares having smooth outer faces, a frame comprising a base and an arm extending at right angles to the base, a level carried by the base, a second level carried by the arm, means on said base for detachably securing it to one arm of the square, and additional means comprising a set screw on said base and engageable with an edge of said arm of the square for adjusting the base to a desired angle relative to said arm of the square, at which desired angle the base may be secured by the first mentioned means.

ALBERT E. RADKE.
JOHN E. WALTER.